Jan. 6, 1970   NAI-CHONG CHANG ET AL   3,487,701
RATE GYRO UTILIZING ELASTIC CONSTRAINT
Filed Jan. 12, 1967   2 Sheets-Sheet 1
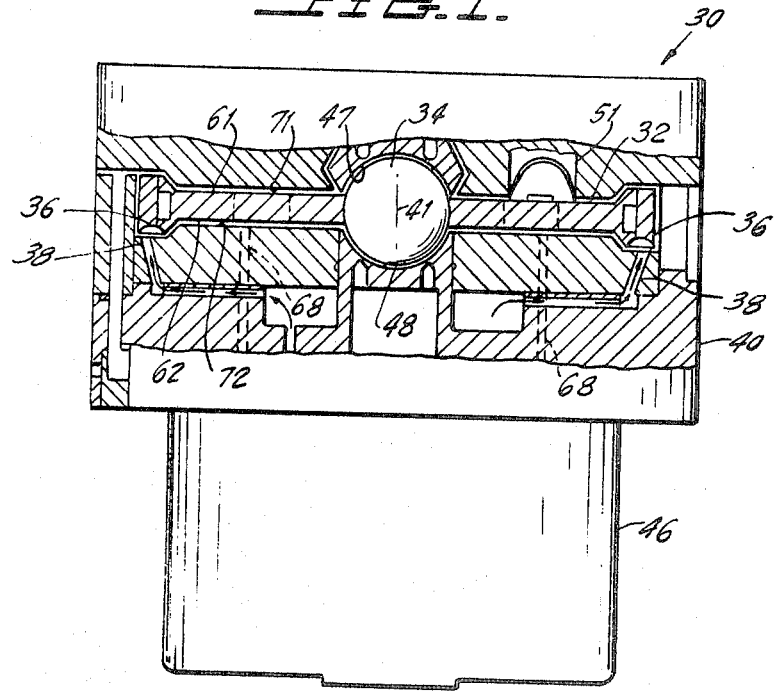
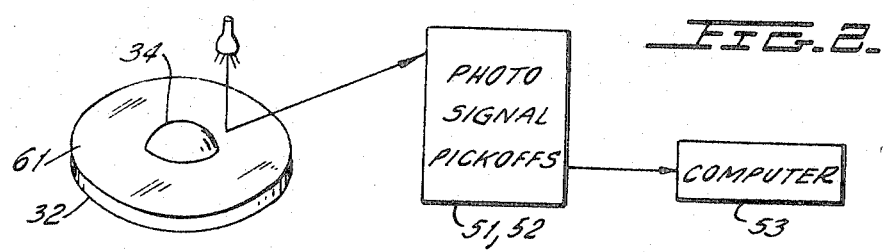
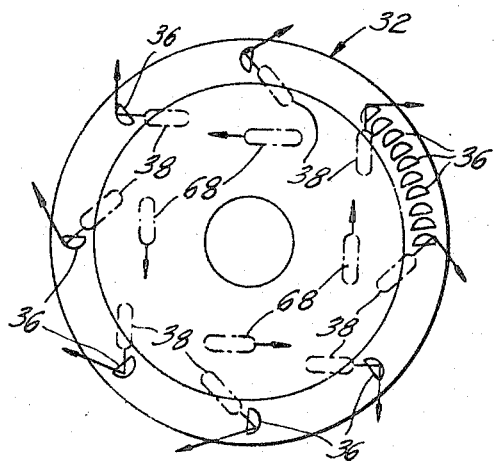
INVENTORS
NAI-CHONG CHANG
HENRY BLAZEK
BY JAMES XENAKIS $$\frac{\partial}{\partial x}\left(\frac{\partial P}{\partial x} h^3\right) = 6\mu \frac{\partial h}{\partial x} U$$

INVENTORS
NAI-CHONG CHANG
HENRY BLAZEK
BY JAMES XENAKIS

United States Patent Office 3,487,701
Patented Jan. 6, 1970

3,487,701
RATE GYRO UTILIZING ELASTIC CONSTRAINT
Nai-Chong Chang, Scarsdale, Henry Blazek, Nyack, and James Xenakis, Woodside, N.Y., assignors to Sperry Rand Corporation, Ford Instrument Company Division, Long Island City, N.Y., a corporation of Delaware
Filed Jan. 12, 1967, Ser. No. 608,813
Int. Cl. G01c 19/04
U.S. Cl. 74—5                              10 Claims

ABSTRACT OF THE DISCLOSURE

A rotating gyro wheel mounted on fluid bearings is disposed with its flat surfaces closely spaced with respect to confronting surfaces of the frame to form a fluid wedge when the spin axis of the wheel moves from its null position. The fluid wedge acts as an elastic constraint producing a precessional torque acting on the wheel in proportion to angular rate.

---

This invention relates to rate gyro devices in general and more particularly relates to devices of this type having means for producing a fluid-dynamic wedge which acts as an elastic constraint providing a precessional torque acting on the gyro wheel when its spin axis moves from a null position in alignment with the measuring axis coinciding with vehicle heading.

Prior art rate gyros operate on the principle of generating a torque equal and opposite to the gyroscopic torque generated by an angular rate. The torque of prior art rate gyros is produced by a torquer feedback loop or by an elastic constraining means operating on the principle of Hooke's Law. Prior art means for producing such elastic constraint required the use of springs.

The rate gyro constituting the instant invention produces an elastic constraint without utilizing springs and in so doing results in a device which is much simpler and more reliable than existing devices which perform the same function. In particular, the device of the instant invention produces an elastic constraint by means of a fluid-dynamic wedge effect.

By utilizing means for producing a fluid-dynamic wedge effect, the scale factor for the rate gyro of the instant invention is insensitive to variations in gyro wheel speed. Further, the rate gyro of the instant invention is relatively insensitive to variations in temperature and is capable of measuring two components of angular rate.

Accordingly, a primary object of the instant invention is to provide a novel construction for an angular rate detecting means.

Another object is to provide a rate gyro construction that does not require mechanical springs or torquer feedback loops.

Still another object is to provide a rate gyro which is not effected by variations in gyro wheel speed and is capable of providing two components of angular rate.

A further object is to provide a rate gyro which utilizes a fluid-dynamic wedge to produce a torque on the spinning gyro wheel in proportion to offset of the gyro wheel spin axis from its null position.

A still further object is to provide a rate gyro which is completely self-contained, is capable of being activated in a short period of time and is capable of operating in high "g" environments.

These as well as other objects of this invention will become readily apparent after reading the following description of the accompanying drawings in which:

FIGURE 1 is a side elevation of a rate gyro constructed in accordance with the teachings of the instant invention with certain portions sectioned to reveal the operating relationship between internal elements.

FIGURE 1A is a bottom plan view of the gyro wheel shown in FIGURE 1.

FIGURE 2 is a schematic showing the gyro wheel and means for producing an output related to angular rate.

Figure 3:
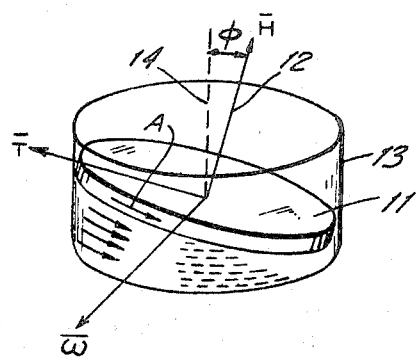
FIGURE 3 is a perspective of a spinning disk disposed within a closed cylindrical container for the purpose of explaining the principle of operation of the device illustrated in FIGURE 1.

Now referring to the figures and more particularly to FIGURE 3 which shows disk 11 rotating about spin axis 12 in the direction indicated by arrow A. Disk 11 is disposed within closed cylindrical container 13 having its cylindrical axis at 14. When spin axis 12 of disk 11 is in a null position aligned with cylindrical axis 14, the viscosity of gas within container 13 generates a torque about spin axis 12 tending to slow the rotation of disk 11.

When cylindrical axis 14 is offset from spin axis 12 by angle $\phi$, in addition to the torque about spin axis 12, there will be a torque T about an axis normal to spin axis 12 with such torque T tending to cause disk 11 to precess according to the law of the gyroscope:

$$\overline{T} = \overline{W} \times \overline{H}$$

where $\overline{T}$ = torque vector acting on disk
$\overline{W}$ = rate of precession of disk
$\overline{H}$ = angular momentum of disk This precessional torque results from pressure differentials on the surface of disk 11 generated by the fluid-dynamic wedge effect, a phenomenon similar to that which occurs in slider bearings and hydro-dynamic spin bearings.

Figure 4:
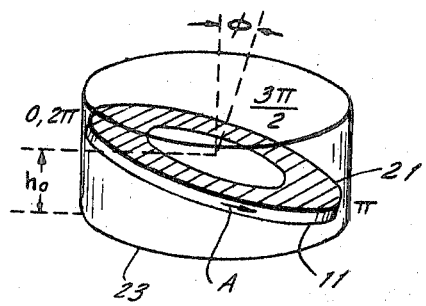
FIGURE 4 is a schematic of an analytical model.
Figure 5:
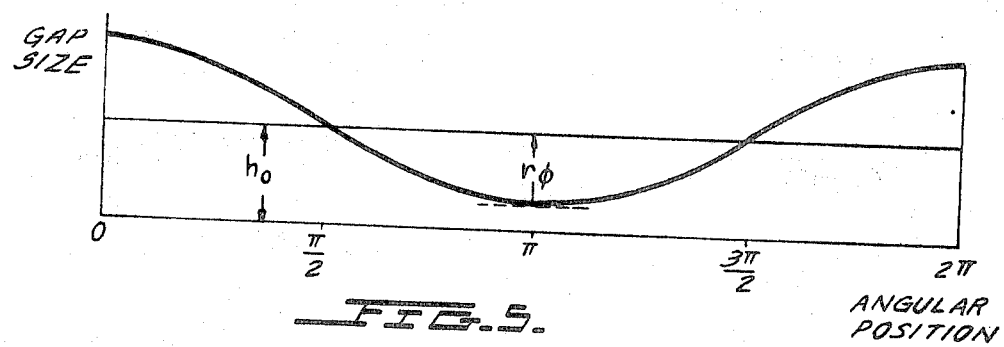
FIGURE 5 is a diagram showing the sinusoidal variation in spacing between the angular ring on the surface of the disk and the bottom of the container in FIGURE 4.

FIGURE 4 illustrates a one dimensional analytical model of the phenomenon obtained by considering angular ring 21 on the surface of disk 11 having its center spaced from the bottom of container 13 by distance $h_0$. As seen in FIGURE 5, as one proceeds around a diameter of ring 21 from 0 to 2π the gap between disk 11 and container bottom 23 varies sinusoidally. By assuming no variations in a direction normal to the sheet of drawings, the one dimensional analytical model of FIGURE 4 is readily analyzed by techniques developed for slider bearing analysis.

Figure 6:
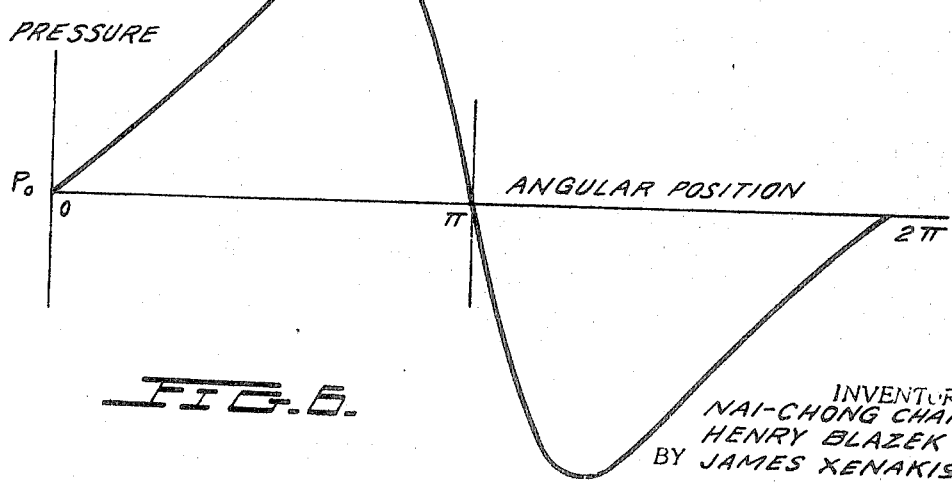
FIGURE 6 is a diagram showing pressure variation as a function of angular position.

Variation of pressure with angular position is computed by utilizing Reynolds equation. FIGURE 6 shows a plot of pressure variation as a function of angular position. Torque resulting from pressure distribution on the surface of disk 11 is computed by integrating differential torques over the surface of disk 11. The direction of the torque vector resulting from the deviation of angle $\phi$ is as shown in FIGURE 3.

This torque $\overline{T}$ is a linear function of the disk angular velocity. Further, since disk angular momentum H is also a linear function of disk angular velocity and since the input rate is effectively computed from the equation $\overline{T} = \overline{W} \times \overline{H}$, it is evident that the indicated angular rate from the rate gyro of FIGURE 1 is independent of disk angular velocity.

The rate gyro 30 of FIGURE 1 includes circular plate-like rotor or gyro wheel 32 having sphere 34 at the center thereto. The periphery of gyro wheel 32 is enlarged with the lower surface thereof having spin-up buckets 36 formed therein positioned to receive fluid jet issuing from fluid passages 38 of frame 40. The fluid jets issuing from passages 38 and impinging upon buckets 36 drive gyro wheel 32 up to operating rotational speed about its spin axis 41 which is perpendicular to and at the center of gyro wheel 32. In order to increase operating time beyond coast down time of gyro wheel 32, sustainer jets issuing from passages 68 maintain gyro wheel speed near its nominal value until the supply of fluid under pressure in container 46 is exhausted.

Signals relating to the processional rate of rotor 32 are obtained by photo pickoffs 51, 52 which transmit signals proportional to processional rate to different channels of computer 53 which converts such signals to two components of angular rate and/or the resultant of such components.

For the preferred embodiment of the instant invention the fluid within container 46 is air under pressure which is also used for the spherical bearing means which supports gyro wheel 32. In particular, sphere 34 is disposed between spherical air bearing pads 47, 48 in closely spaced relationship. For details of a suitable spherical air bearing means, rotor spin-up apparatus, and signal pickoks, reference is made to copending application Ser. No. 312,-462, filed Sept. 30, 1963, now Patent No 3,321,979, for FAS-101 Attitude Sensor with H. Blazek et al. as inventors, and assigned to the assignee of the instant invention.

As seen in FIGURE 1, gyro wheel 32 is in its null position. That is, spin axis 41 is aligned with the measuring axis of frame 40 which corresponds to cylindrical axis 14 of FIGURE 3. When rate gyro 30 is mounted to a vehicle frame 40 is so positioned that such measuring axis coincides with the heading of the vehicle.

In the null position for gyro wheel 32 its opposite planar surfaces 61, 62, positioned perpendicular to spin axis 41, are parallel to frame surfaces 71, 72 respectively. As seen in FIGURE 1 relatively narrow spaces are formed between surfaces 61, 71 and 62, 72. These narrow spaces become wedge shaped when spin axis 41 deviates from the measuring axis. Such narrow spaces are occupied by air under pressure and as a result fluid-dynamic wedges are formed adjacent to gyro wheel surfaces 61, 62 and provide an elastic constraint producing a torque on spinning gyro wheel 32 proportional to the offset of spin axis 41 from its null position resulting in procession of gyro wheel 32 at a rate proportional to the angular rate of the vehicle.

In a typical rate gyro constructed in accordance with the teachings of the instant invention, the plate-like portion of gyro wheel 32 has an inner diameter of ⅜ inch and an outer diameter of 2 inches. With spin axis 41 in its null position, the spacing between surfaces 61, 71 and 62, 72 is in the range between .0005 and .005 inch.

It should now be evident that the spherical air bearings used for support of the gyro wheel may be replaced by other bearing means capable of performing the same function. In addition, the photo pickoffs may be replaced by pneumatic pickoffs.

Thus, it is seen that the instant invention provides a novel rate ryro which utilizes a fluid-dynamic wedge effect to obtain an elastic constraint which provides a torque on the spinning gyro wheel proportional to the effect of the spin axis from its null position and in so doing eliminates the necessity for physical springs or torquer feedback loops to produce a torque in opposition to the gyroscopic torque generated by an angular rate.

Although there has been described a preferred embodiment of this novel invention, many variations and modifications will now be apparent to those skilled in the art. Therefore, this invention is to be limited, not by the specific disclosure herein but only by the appending claims.

What we claim is:

1. A rate gyro device including a gyro wheel, bearing means supporting said wheel for rotation about a spin axis, said wheel including a circular plate-like section disposed generally perpendicular to said spin axis and symmetrically disposed with respect thereto, means for rotating said wheel about said spin axis, a frame with frame surfaces confronting opposite wheel surfaces of said plate-like section that are perpendicular to said spin axis, said frame surfaces being closely spaced with respect to said wheel surfaces to form narrow spaces therebetween, fluid occupying said narrow spaces, said frame surfaces disposed generally perpendicular to a measuring axis coinciding with heading for a vehicle to which said frame is mounted, said bearing means supporting said wheel for movement to a null position wherein said spin axis and said measuring axis are coincident, said bearing means also permitting said spin axis to tilt from said null position relative to said measuring axis whereby fluid-dynamic wedges form in said narrow spaces, said fluid-dynamic wedges producing an elastic constraint providing a precessional torque acting on said wheel in proportion to precessional rate of said wheel when said spin axis moves from said null position, pickoff means for detecting the precessional rate of said wheel and in response thereto producing a signal related to angular rate, said bearing means mounting said wheel for tilting about a first and a second axis, said first and said second axes being perpendicular to each other and perpendicular to said measuring axis.

2. A rate gyro as set forth in claim 1 in which there is a container on said frame, said container having a supply of fluid under pressure, some of said fluid from said container constituting said fluid occupying said spaces, said fluid of said bearing means supporting said wheel including fluid from said container.

3. A rate gyro as set forth in claim 2 in which said means for rotating said wheel comprises fluid from said container which is directed as jet means impinging upon said wheel.

4. A rate gyro as set forth in claim 1 in which said bearing means also includes a spherical portion mounted to said wheel at its center, spherical pads between which said spherical portion is mounted, and fluid in spaces between said pads and said spherical portion.

5. A rate gyro as set forth in claim 4 in which said fluid is air.

6. A rate gyro as set forth in claim 1 in which said means for rotating said wheel comprises fluid jet means impinging upon said wheel as the periphery thereof.

7. A rate gyro as set forth in claim 5 in which there is a container on said frame, said container having a supply of fluid under pressure, some of said fluid from said container constituting said fluid occupying said spaces, said fluid of said bearing means supporting said wheel including fluid from said container.

8. A rate gyro as set forth in claim 7 in which said jet means is derived from fluid supplied from said container.

9. A gyro rate device including a gyro wheel, bearing means supporting said wheel for rotation about a spin axis, said wheel including a circular plate-like section disposed generally perpendicular to said spin axis and symmetrically disposed with respect thereto, means for rotating said wheel about said spin axis, a frame with frame surfaces confronting opposite wheel surfaces of said plate-like section that are perpendicular to said spin axis, said frame surfaces being closely spaced with respect to said wheel surfaces to form narrow spaces therebetween, fluid occupying said narrow spaces, said frame surfaces disposed generally perpendicular to a measuring axis coinciding with heading for a vehicle to which said frame is mounted, said bearing means supporting said wheel for movement to a null position wherein said spin axis and said measuring axis are coincident, said bearing means also permitting said spin axis to tilt from said null position relative to said measuring axis whereby fluid-dynamic wedges form in said narrow spaces, said fluid-dynamic wedges producing an elastic constraint providing a precessional torque acting on said wheel in proportion to precessional rate of said wheel when said spin axis moves from said null position, pickoff means for detecting the precessional rate of said wheel and in response thereto producing a signal related to angular rate, said spaces being in the range of .0005 to .005 inch thick when said spin axis is in said null position.

10. A rate gyro device including a gyro wheel, bearing means supporting said wheel for rotation about a spin axis, said wheel including a circular plate-like section disposed generally perpendicular to said spin axis and symmetrically disposed with respect thereto, means for rotating said wheel about said spin axis, a frame with frame surfaces confronting opposite wheel surfaces of said plate-like section that are perpendicular to said spin axis, said frame surfaces being closely spaced with respect to said wheel surfaces to form narrow spaces therebetween, fluid occupying said narrow spaces, said frame surfaces disposed generally perpendicular to a measuring axis coinciding with heading for a vehicle to which said frame is mounted, said bearing means supporting said wheel for movement to a null position wherein said spin axis and said measuring axis are coincident, said bearing means also permitting said spin axis to tilt from said null position relative to said measuring axis whereby fluid-dynamic wedges form in said narrow spaces, said fluid-dynamic wedges producing an elastic constraint providing a precessional torque acting on said wheel in proportion to precessional rate of said wheel when said spin axis moves from said null position, pickoff means for detecting the precessional rate of said wheel and in response thereto producing a signal related to angular rate, said plate-like section being in the form of a ring.

References Cited

UNITED STATES PATENTS

| | | | |
|---|---|---|---|
| 3,152,845 | 10/1964 | Ertaud et al. | |
| 3,194,613 | 7/1965 | Pierry et al. | 308—9 |
| 3,199,931 | 8/1965 | Martz. | |
| 3,210,848 | 10/1965 | Bizzigotti. | |
| 3,311,987 | 4/1967 | Blazek | 74—5 |
| 3,321,199 | 5/1967 | Blazek et al. | 74—5 |

OTHER REFERENCES

IBM Tech. Disclose Bulletin, 1 page, vol. 4, No. 5, October 1961.

FRED C. MATTERN, Jr., Primary Examiner

MANUEL ANTONAKAS, Assistant Examiner

U.S. Cl. X.R.

74—543; 308—9